United States Patent
Cohen et al.

(10) Patent No.: US 9,414,141 B2
(45) Date of Patent: Aug. 9, 2016

(54) MESH STRUCTURE PROVIDING ENHANCED ACOUSTIC COUPLING

(75) Inventors: Sawyer I. Cohen, Sunnyvale, CA (US); Jared M. Kole, San Jose, CA (US); Michael B. Wittenberg, Sunnyvale, CA (US); Nicholas Merz, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 13/343,645

(22) Filed: Jan. 4, 2012

(65) Prior Publication Data

US 2013/0170109 A1    Jul. 4, 2013

(51) Int. Cl.
| | |
|---|---|
| H04R 1/02 | (2006.01) |
| H04R 1/08 | (2006.01) |
| H04R 7/00 | (2006.01) |
| H04M 1/03 | (2006.01) |
| H04M 1/18 | (2006.01) |

(52) U.S. Cl.
CPC ............... *H04R 1/023* (2013.01); *H04M 1/03* (2013.01); *H04R 1/02* (2013.01); *H04R 1/086* (2013.01); *H04R 7/00* (2013.01); *H04M 1/035* (2013.01); *H04M 1/18* (2013.01); *H04R 2499/11* (2013.01); *Y10T 29/49002* (2015.01)

(58) Field of Classification Search
CPC .............. H04R 1/02; H04R 3/00; H04R 7/00; H04R 2499/11
USPC ........................ 181/149; 361/679.01; 29/592.1
See application file for complete search history.

(56) References Cited

U.S. PATENT DOCUMENTS

| | | | | |
|---|---|---|---|---|
| RE28,420 E | * | 5/1975 | Murphy | H04R 19/01 381/173 |
| 5,828,012 A | * | 10/1998 | Repolle | H04R 1/023 181/175 |
| 6,258,438 B1 | * | 7/2001 | Loveland | B32B 5/26 181/141 |
| 6,321,070 B1 | * | 11/2001 | Clark | H04M 1/0214 455/347 |
| 7,358,633 B2 | | 4/2008 | Kweon et al. | |
| 8,442,254 B2 | * | 5/2013 | Yu | H04R 1/025 381/334 |
| 8,631,558 B2 | * | 1/2014 | Liang | H04R 1/00 29/592 |
| 8,724,841 B2 | * | 5/2014 | Bright | H04R 1/086 181/284 |
| 2005/0077102 A1 | * | 4/2005 | Banter | H04R 1/086 181/149 |
| 2006/0094378 A1 | | 5/2006 | Murray et al. | |

(Continued)

FOREIGN PATENT DOCUMENTS

| | | |
|---|---|---|
| DE | 11 47 983 B | 5/1963 |
| DE | 20 2004 011510 | 12/2004 |
| EP | 1 686 834 A1 | 8/2006 |

*Primary Examiner* — David Warren
*Assistant Examiner* — Christina Schreiber
(74) *Attorney, Agent, or Firm* — Brownstein Hyatt Farber Schreck, LLP (57) ABSTRACT

A portable electronic device that provides compact configurations for audio elements are disclosed. The audio elements can be drivers (e.g., speakers) or receivers (e.g., microphones). According to one aspect, mesh structures, such as mesh barriers, are formed to facilitate improved acoustic sealing in a space efficient manner. In one embodiment, a mesh barrier for an audio port can be reliably acoustically sealed (or coupled) with an audio chamber and/or outer device housing in a space efficient manner. A mesh barrier can serve to block undesired foreign substances from entry or further entry into an audio port and/or serve as a cosmetic barrier which obscures vision into an audio port. In one embodiment, a portion of a mesh structure can be provided with a substantially planar surface that facilitates improved acoustic sealing.

21 Claims, 10 Drawing Sheets

(56) References Cited

U.S. PATENT DOCUMENTS

| | | | | |
|---|---|---|---|---|
| 2006/0188126 A1* | 8/2006 | Andersen | H04M 1/03 | 381/396 |
| 2008/0149417 A1* | 6/2008 | Dinh | H04M 1/03 | 181/145 |
| 2009/0245565 A1* | 10/2009 | Mittleman | H04M 1/035 | 381/365 |
| 2010/0231060 A1 | 9/2010 | Bang et al. | | |
| 2011/0255726 A1* | 10/2011 | Yu | H04R 1/025 | 381/332 |
| 2011/0261986 A1* | 10/2011 | Murayama | G01M 3/26 | 381/332 |
| 2012/0045081 A1* | 2/2012 | Mittleman | H04M 1/035 | 381/334 |
| 2012/0177237 A1* | 7/2012 | Shukla | B29C 45/1671 | 381/332 |
| 2012/0257776 A1* | 10/2012 | Ozcan | H04M 1/035 | 381/345 |
| 2013/0108082 A1* | 5/2013 | Dave | H04R 1/086 | 381/122 |
| 2013/0170109 A1* | 7/2013 | Cohen | H04M 1/03 | 361/679.01 |
| 2013/0271902 A1* | 10/2013 | Lai et al. | | 361/679.01 |
| 2016/0073183 A1* | 3/2016 | Auclair | H04R 1/02 | 181/151 |

* cited by examiner

MESH STRUCTURE PROVIDING ENHANCED ACOUSTIC COUPLING

BACKGROUND OF THE INVENTION

1. Field of the Invention

The present invention relates to audio ports for electronic devices and, more particularly, for audio port configurations for compact electronic devices.

2. Description of the Related Art

Portable electronic devices often provide audio jacks (i.e., audio connectors) that facilitate connection with headsets or headphones which provide personal external speakers for their users. Portable electronic devices can provide one or more internal speakers that are able to be utilized for producing audio sound. Similarly, portable electronic devices can have a microphone jack that facilitates connection with a microphone which can be externally provided for a user. Portable electronic device can also provide one or more internal microphones that are able to be used to pickup (i.e., receive) audio sound.

There is, however, an ongoing need to make portable electronic devices smaller and thinner. As portable electronic devices get smaller and thinner, there are increased difficulties in providing the same or greater functionality in a smaller area. With respect to audio sound, a portable electronic device can utilize one or more speakers and one or more microphones provided internal to the housing of the portable electronic device. Unfortunately, given the area constraints imposed on many portable electronic devices, it is increasingly difficult to provide high-quality audio sound output and pickup without hindering the ability to make portable electronic devices smaller and thinner. Consequently, there is a need for improved approaches to provide high-quality audio sound output and/or pickup from portable electronic devices as they get smaller and thinner.

One or more audio ports are usually provided with portable electronic device to support the audio sound output and pickup. Typically, the one or more audio ports have a barrier, such as a mesh barrier, so that undesired foreign substances can be blocked from entry or further entry into the audio port.

Unfortunately, however, a mesh barrier, is typically an interwoven structure that present difficulties in sealing such against an outer housing or audio port components. Hence, there remains a need to reliably seal to mesh barriers in a space efficient manner (e.g., with minimum thickness).

SUMMARY

The invention pertains to a portable electronic device that provides compact configurations for audio elements. The audio elements can be drivers (e.g., speakers) or receivers (e.g., microphones). According to one aspect, mesh structures, such as mesh barriers, are formed to facilitate improved acoustic sealing in a space efficient manner. In one embodiment, a mesh barrier for an audio port can be reliably acoustically sealed (or coupled) with an audio chamber and/or outer device housing in a space efficient manner. A mesh barrier can serve to block undesired foreign substances from entry or further entry into an audio port and/or serve as a cosmetic barrier which obscures vision into an audio port. In one embodiment, a portion of a mesh structure can be provided with a substantially planar surface that facilitates improved acoustic sealing.

The invention can be implemented in numerous ways, including as a method, system, device, or apparatus. Several embodiments of the invention are discussed below.

As a mesh structure for an acoustic port opening of an outer surface of a housing of a portable electronic device, where the acoustic port opening pertains to an acoustic port provided within the housing of the portable electronic device, one embodiment can, for example, include at least a mesh article having a weave configuration of overlapping elements. The mesh article can have a central portion and an outer peripheral portion. The outer peripheral portion can have a more reliable sealing surface that facilitates acoustic sealing of the mesh article within the acoustic port.

As a portable electronic device, one embodiment can, for example, include at least: a housing having an inner surface and an outer surface, the housing having an audio port opening; an audio component provided internal to the housing; an acoustic chamber provided internal to the housing, the acoustic chamber having an internal audio channel through the acoustic chamber from a first end to a second end; and a mesh barrier having a peripheral frame. The peripheral frame can have a first side and a second side. The first side of the peripheral frame can be acoustically sealed adjacent to the second end of the acoustic chamber, and the second side of the peripheral frame can be acoustically sealed adjacent to the inner surface of the housing adjacent the audio port opening. The first end of the acoustic chamber can be acoustically sealed adjacent to the audio port component.

As a mesh structure for an acoustic port opening of an outer surface of a housing of a portable electronic device, where an acoustic port provided internal to the housing is acoustically coupled to the acoustic port opening, one embodiment can, for example, include at least a plurality of interweaved elements configured to provide an inner mesh region and an outer sealing region. The outer sealing region of the mesh structure can be modified to facilitate sealing against counterpart structures proximate to the acoustic port opening of the housing.

As a method for sealing a mesh structure within an acoustical port of an electronic product, one embodiment can, for example, include at least: obtaining a mesh sheet; processing the mesh sheet to provide modified outer regions for a plurality of mesh instances; and singulating the mesh instances from the processed mesh sheet to provide a plurality of mesh structures.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

It should be noted that FIGS. 1-10 are not necessarily drawn to scale. Instead, these figures are enlarged so that features are more readily visible.

DETAILED DESCRIPTION OF EMBODIMENTS OF THE INVENTION

The invention pertains to a portable electronic device that provides compact configurations for audio elements. The audio elements can be drivers (e.g., speakers) or receivers (e.g., microphones). According to one aspect, mesh structures, such as mesh barriers, are formed to facilitate improved acoustic sealing in a space efficient manner. In one embodiment, a mesh barrier for an audio port can be reliably acoustically sealed (or coupled) with an audio chamber and/or outer device housing in a space efficient manner. A mesh barrier can serve to block undesired foreign substances from entry or further entry into an audio port and/or serve as a cosmetic barrier which obscures vision into an audio port. In one embodiment, a portion of a mesh structure can be provided with a substantially planar surface that facilitates improved acoustic sealing.

Exemplary embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
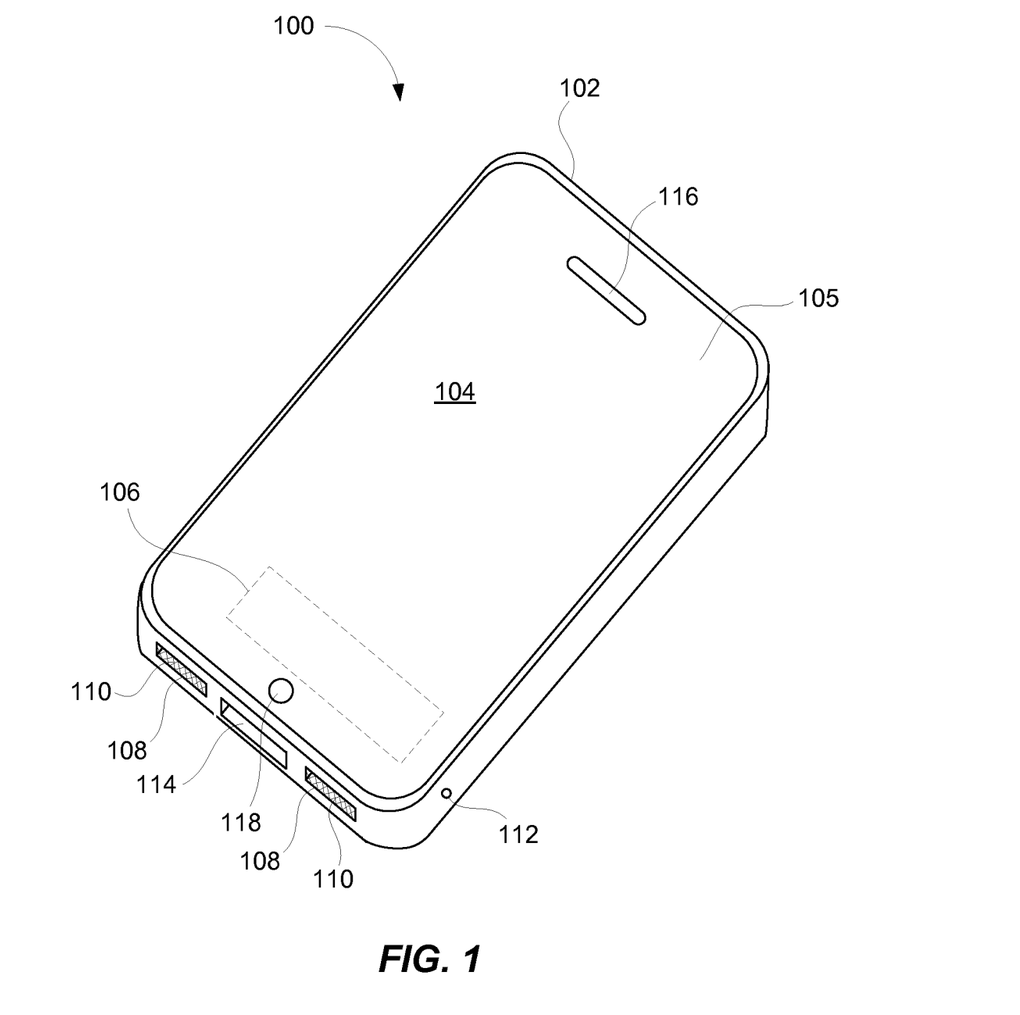
FIG. 1 is a perspective diagram of a portable electronic device according to one embodiment.

FIG. 1 is a perspective diagram of a portable electronic device 100 according to one embodiment. The portable electronic device 100 is a representative illustration for a portable electronic device. However, it should be understood that, in other embodiments, the size, scale, shape, configuration and/or appearance of the portable electronic device 100 can vary widely.

The portable electronic device 100 includes a housing 102 that provides an exterior surface for the portable electronic device 100. The portable electronic device 100 provides one or more functional capabilities that can be utilized by its user. In so doing, the portable electronic device can include at least one input/output component 104.

The user input/output component 104 typically includes one or more user input devices and/or one or more output device. The one or more user input devices can allow the user to interact with the portable electronic device. The one or more output devices can provide outputs from the portable electronic device to the user or another device. The input/output component 104 can, for example, pertain to one or more of a display, a touch screen, a touchpad, a keypad, a button, a dial, and etc. For example, the input/output component 104 can provide a display and a touch screen combination, with the display providing output capability and the touch screen providing input capability.

The portable electronic device 100 can also include an audio circuit 106. The audio circuit 106 is typically provided internal to the housing 102 of the portable electronic device 100. The audio circuit 106 can operate to produce audio signals that can be supplied to one or more speakers internal to the housing 102 of the portable electronic device 100. The one or more speakers, in response to the audio signals, can produce audio sound that can be directed (e.g., by way of one or more acoustic chambers) to one or more audio output openings 108 in the housing 102 of the portable electronic device 100. In one embodiment, each of the one or more audio output openings 108 can include a mesh cover 110 that serves to protect foreign matter from entering into the housing 102 of the portable electronic device 100 by way of the audio output opening 108.

The audio circuit 106 can also operate to receive audio signals that are picked-up by one or more microphones internal to the housing 102 of the portable electronic device 100. The one or more microphones can pick-up audio sounds that are received (e.g., directly or by way of one or more acoustic chambers) via an audio input opening 112 in the housing 102 of the portable electronic device 100. In general, the portable electronic device 100 can place the audio input opening 112 in any of various location. However, in this embodiment, the audio input opening 112 is provided on a side of the housing 102. In one embodiment, the audio input opening 112 can also include a mesh cover (not shown) that serves to protect foreign matter from entering into the housing 102 of the portable electronic device 100 by way of the audio input opening 112.

The housing 102 of the portable electronic device 100 can also include an external connection port 114. The external connection port 114 allows the portable electronic device 100 to be directly or indirectly connected to a host device (e.g., personal computer) or other electronic devices (e.g., docking station), so as to exchange data or to charge a battery (not shown) utilized by the portable electronic device 100.

The portable electronic device 100 can also include a receiver opening 116 and a button opening 118. The receiver opening 116 can be provided adjacent an internal receiver (e.g., speaker) that can provide audio output to a user of the portable electronic device 100. The button opening 118 can be provided adjacent a button that allows the user to interact with the portable electronic device 100. Although the receiver opening 116 and the button opening can be provided in the translucent face 105, it should be understood that these components could be provided elsewhere in the portable electronic device 100. For example, these components could be provided at the side of the portable electronic device 100. The translucent face 105 can be a glass sheet or a plastic sheet. The translucent face 105 provides a front face for the housing. The translucent face can also be thin, such as having a thickness of less than 1 millimeter.

The portable electronic device 100 can include any suitable type of electronic device having a display. For example, the portable electronic device 100 can be a laptop, tablet computer, media player, phone, GPS unit, remote control, personal digital assistant (PDA), and the like, and devices combining some or all of this functionality. Depending on the capabilities of the portable electronic device 100, internal to the portable electronic device 100 are various electrical components that serve support the device capabilities. The electronic components include one or more of integrated circuit(s), electronic substrate(s) (flex circuits, printed circuit boards), wireless transceiver(s), battery(s), microphone(s), speaker(s), display circuitry(s), touch circuitry(s), and connectors (e.g., ports), user input devices (button, switches, etc.).

According to one embodiment, the portable electronic device 100 can be provided with a compact configuration for audio elements. The audio elements can be drivers (e.g., speakers) or receivers (e.g., microphones). An audio element can be mounted on or coupled to an acoustic chamber having an opening therein to allow audio sound to pass there through. The acoustic chamber can assist in directing audio sound between the audio output opening 108 and the audio element. As noted above, the audio output opening 108 can include the mesh cover 110 to protect foreign matter from entering into the housing 102 and thus the acoustic chamber of the portable electronic device 100 by way of the audio output opening 108. The mesh cover 110 can be formed or modified to improve its acoustic sealing with respect to the acoustic chamber. For example, the mesh cover 110 can be reliably sealed to the audio output openings 108 of the housing 102 (and/or some other structure within the housing 102).

Figure 2:
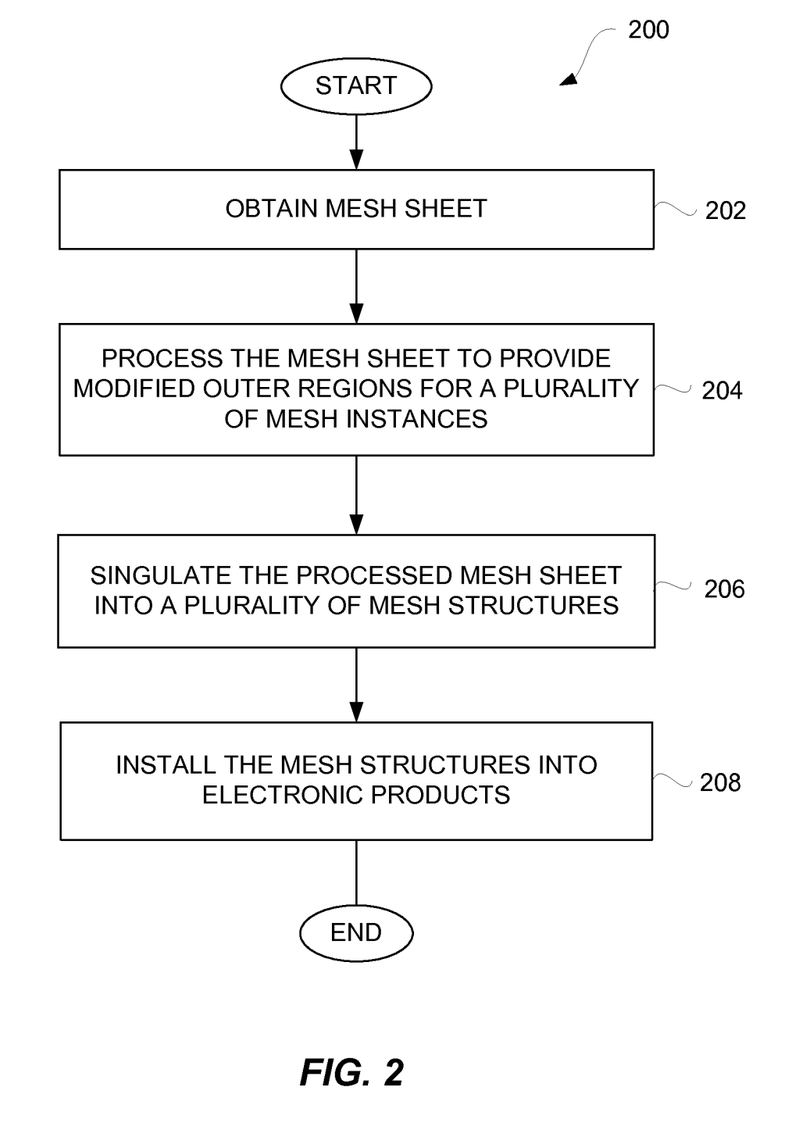
FIG. 2 is a flow diagram of a mesh assembly process according to one embodiment.

FIG. 2 is a flow diagram of a mesh assembly process 200 according to one embodiment. The mesh assembly process 200 can serve to produce mesh structures that can be used with electronic device housings. A mesh structure can pertain to a barrier (or mesh barrier). In one implementation, the mesh structure can serve to block undesired foreign substances from entry or further entry into an audio chamber provided internal to an electronic device housing. In another implementation, the mesh structure can serve as a cosmetic mesh that is provided at or near an opening at outer surface of an electronic device housing. For example, the cosmetic mesh can obscure vision into an opening, e.g., audio opening, of the electronic device housing.

The mesh assembly process 200 can initially obtain 202 a mesh sheet. The mesh sheet can be processed 204 to provide modified outer regions for a plurality of mesh instances. The processing of the mesh sheet to provide the modified outer regions can vary depending upon implementation. In one example, an electroforming technique can be utilized to form the modified outer regions for the plurality of mesh instances. For example, Nickel can be electroformed at outer regions of the plurality of mesh instances. In another embodiment, a photo-curing technique can be utilized to form the modified outer regions for the plurality of mesh instances. In another embodiment, a thermoplastic film can be utilized to form the modified outer regions for the plurality of mesh instances. In another embodiment, an adhesive or silicone buildup can be utilized to form the modified outer regions for the plurality of mesh instances. In yet another embodiment, a compressive technique can be utilized to form the modified outer regions for the plurality of mesh instances.

After the mesh sheet has been processed 204 to provide the modified outer regions for the plurality of mesh instances, the processed mesh sheet can then be singulated 206 into a plurality of mesh structures. By using a mesh sheet, processing can concurrently form a plurality of mesh instances, which provided for efficient manufacture of the mesh structures. In assembling a given electronic device, or its housings, one or more of the mesh structures can, for example, be used as a barrier, such as a mesh barrier, for an opening, such as an audio port opening, in an electronic device housing. For example, the resulting mesh structures can serve as mesh barriers, such as cosmetic meshes, for audio ports of electronic device housings. Typically, the mesh structures can be visible to users of the electronic device housings and can serve to provide a cosmetic appearance and/or can serve to block undesired foreign substances from entry or further entry into an exposed audio port of an electronic device housing. Thereafter, as desired, the resulting mesh structures can be installed 208 into electronic products.

In one embodiment, a mesh structure can pertain to a barrier, or mesh barrier, that serves to block undesired foreign substances from entry or further entry into an audio chamber provided internal to an electronic device housing. In the same or another embodiment, a mesh structure can serve as a cosmetic mesh (or cosmetic barrier) that is provided at or near an audio opening in an outer surface for an electronic device housing. The cosmetic mesh can provide a cosmetic appearance to the audio opening.

Figure 3A:
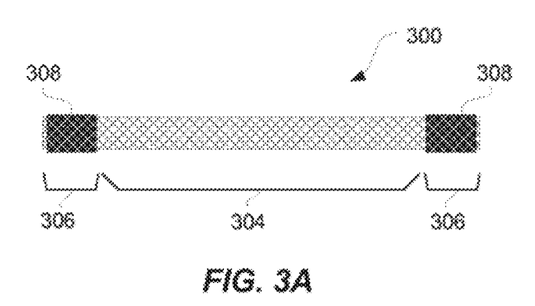
FIG. 3A is a cross-sectional view of a mesh structure according to one embodiment.

FIG. 3A is a cross-sectional view of a mesh structure 300 according to one embodiment. The mesh structure 300 can be used as a mesh barrier, such as an actual particle barrier or a cosmetic barrier. The mesh structure 300 has an inner region 304 (or central region) and an outer region 306. In one embodiment, the mesh structure 300 can have a circular structure and the outer region 306 can represent a circular outer peripheral region. In one embodiment, the mesh structure 300, both the inner region 304 and the outer region 306, can be a woven structure formed from metal wires (e.g., stainless steel wire). The outer region 306 is also processed or formed to provide a sealed area 308. In this embodiment, the sealed area 308 can be processed or formed by adhering or binding (e.g., through electroforming, embedding, painting, or pressing) material into the mesh structure 300 at the outer region 306. The sealed area 308 of the outer region 306 can operate to render the mesh structure 300 at the outer region 306 able to be acoustically sealable within an acoustic chamber (port) in a more reliable manner. In one embodiment, material being adhered (e.g., bonded, printed, electroformed or embedded) to the outer region 306 to form the sealed region 308. The material may require pressure, curing, drying, optical energy or electrical energy before being adhered to the mesh structure 300. As compared to the inner region 304, the outer region 306 is typically substantially less porous to air flow therethrough.

Figure 3B:
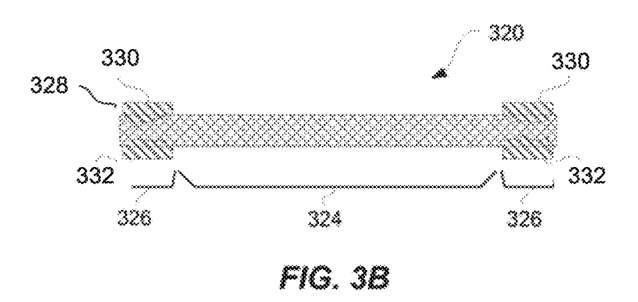
FIG. 3B is a cross-sectional view of a mesh structure according to another embodiment.

FIG. 3B is a cross-sectional view of a mesh structure 320 according to another embodiment. The mesh structure 320 can be used as a mesh barrier, such as an actual particle barrier or a cosmetic barrier. The mesh structure 320 has an inner region 324 (or central region) and an outer region 326. In one embodiment, the mesh structure 320 can have a circular structure and the outer region 326 can represent a circular outer peripheral region. In one embodiment, the mesh structure 320, both the inner region 324 and the outer region 326, can be a woven structure formed from metal wires (e.g., stainless steel wire). The outer region 326 is also processed or formed to provide a sealed area 328. In this embodiment, the sealed area 328 can be processed or formed by adhering or binding (e.g., through electroforming, embedding, painting, or pressing) material into the mesh structure 320 at the outer region 326.

As shown in FIG. 3B, a top layer of material 330 can be adhered to the top portion of the outer region 326, and a bottom layer of material 332 can be adhered to the bottom portion of the outer region 326. In one embodiment, material can be adhered into the outer region 326 from one or both a top side and a bottom side of the mesh structure 320. As shown in FIG. 3B, the material being adhered may only partially embed, bind or form into the outer region 326. In one embodiment, the result of the application of the top layer of material 330 and/or the bottom layer of material 332 can provide a planar surface at the outer region 326. Accordingly, as a result of the forming of the sealed region 328, the outer region 320 can become more planar (or flatter) which allows easier sealing (e.g., acoustically sealing) with other surfaces (such as with a thin layer of adhesive). The sealed area 328 can be referred to as having a fame that facilitates sealing to other surfaces (such as with a thin layer of adhesive). As compared to the inner region 324, the outer region 326 is typically substantially less porous to air flow therethrough.

Figure 3C:
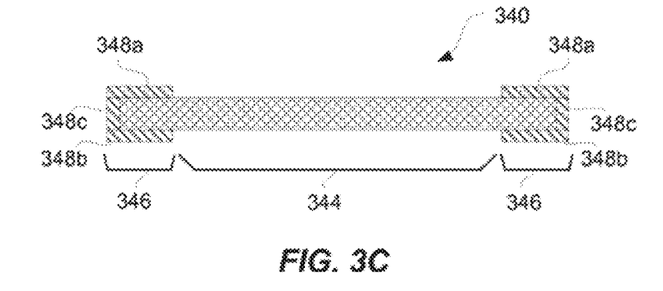
FIG. 3C is a cross-sectional view of a mesh structure according to another embodiment.

FIG. 3C is a cross-sectional view of a mesh structure 340 according to another embodiment. The mesh structure 340 illustrated in FIG. 3C is generally similar to the mesh structure 320, except that sealed area is configured differently. The mesh structure 340 can be used as a mesh barrier, such as a cosmetic mesh. The mesh structure 340 has an inner region 344 (or central region) and an outer region 346. In one embodiment, the mesh structure 340, both the inner region 344 and the outer region 346, can be a woven structure formed from metal wires (e.g., stainless steel wire). The outer region 346 is also processed or formed to provide a sealed area 348. In this embodiment, the sealed area 348 is processed or formed by adhering material into the mesh structure 340 at the outer region 346. For example, material can be adhered to the outer region 346 from one or both a top side, a bottom side and a side of the mesh structure 340. As shown in FIG. 3C, a top layer of material 348a can be adhered to the top portion of the outer region 346, a bottom layer of material 358b can be adhered to the bottom portion of the outer region 346, and a side layer of material 348c can be adhered to the side portion of the outer region 346. In one embodiment, the result of sealed area 348 can provide a planar surface at the outer region 346. As a result of the forming of the sealed region 348, the outer region 346 can become more planar (or flatter) which allows easier sealing (e.g., acoustically sealing) with other surfaces (such as with a thin layer of adhesive). The sealed area 348 can be referred to as having a fame that facilitates sealing to other surfaces (such as with a thin layer of adhesive). As compared to the inner region 344, the outer region 346 is typically substantially less porous to air flow therethrough.

Figure 4:
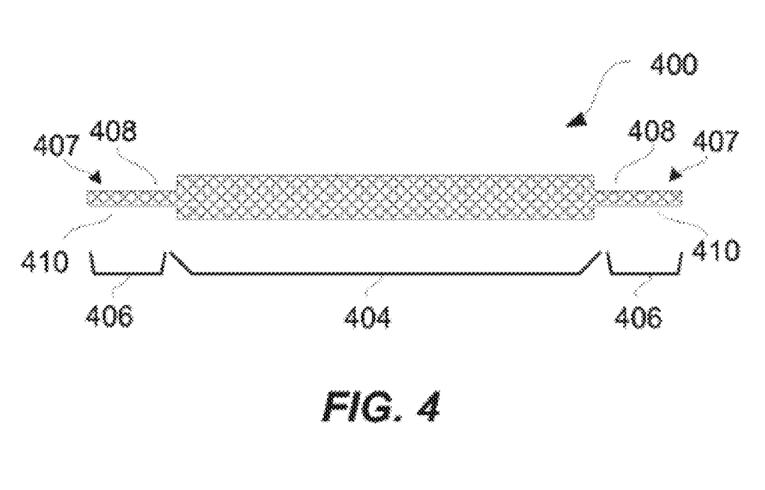
FIG. 4 is a cross-sectional view of a mesh structure according to still another embodiment.

FIG. 4 is a cross-sectional view of a mesh structure 400 according to still another embodiment. The mesh structure 400 can be used as a barrier, such as an actual particle barrier or a cosmetic barrier. The mesh structure 400 has an inner region 404 (or central region) and an outer region 406. In one embodiment, the mesh structure 400 can have a circular structure and the outer region 406 can represent a circular outer peripheral region. In one embodiment, the mesh structure 400, both the inner region 404 and the outer region 406, can be a woven structure formed from metal wires (e.g., stainless steel wire). The outer region 406 is also processed or formed to provide a compressed area 407. In this embodiment, the sealed area 407 is processed or formed by compressing the mesh structure 400 at the outer region 406. As compared to the inner region 404, the outer region 406 (as a result of the compressing) is substantially less porous to air flow therethrough. As shown in FIG. 4, the compressed area 407 can have both top and bottom sides compressed at the outer region 406, which provides a top outer recess 408 and a bottom outer recess 410. The sealed area 407 of the outer region 406 can operate to render the mesh structure 400 at the outer region 406 more reliably acoustically sealable within an acoustic chamber (port). The recesses 408, 410 can also facilitate low profile assembly with or for an electronic device housing.

Embodiments described herein provide a low-profile audio port arrangement. The audio port arrangement can include an acoustic chamber as well as a barrier that can block foreign matter from an audio channel while not blocking the audio sound from passing through the acoustic chamber. The barrier, which is typically woven metal, can be modified to enhanced sealing of the barrier to the acoustic chamber and/or to an audio port region of an electronic device housing.

Figure 5:
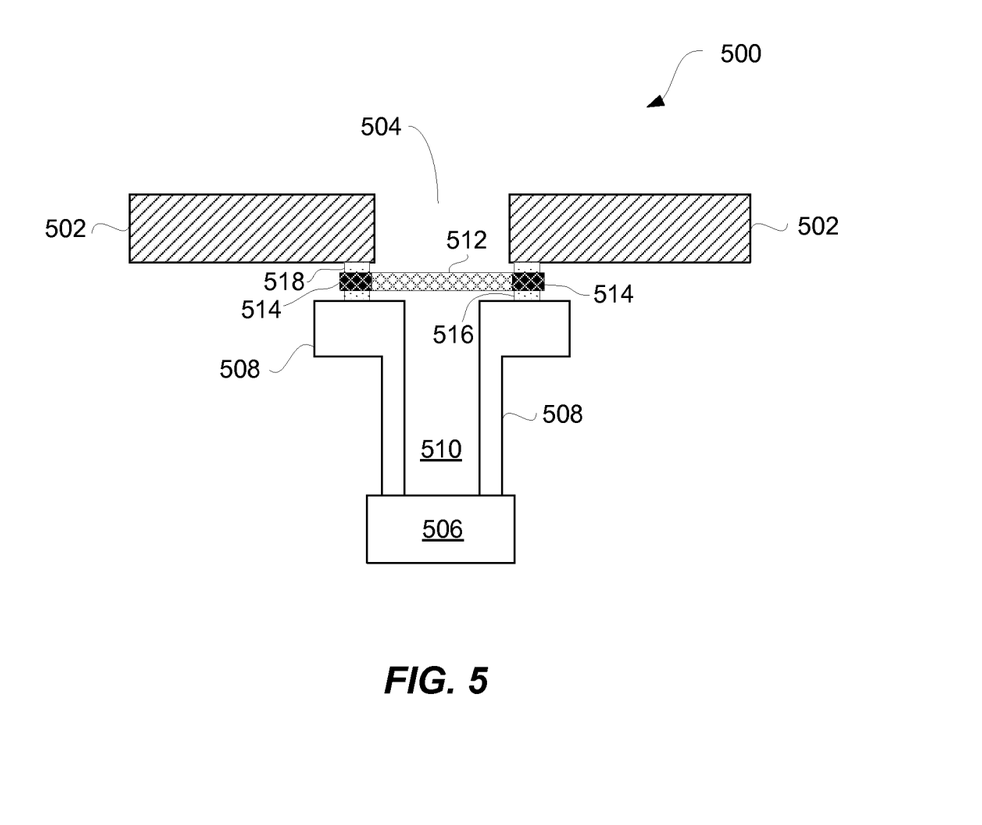
FIG. 5 is a partial cross-sectional diagram of a portion of a portable electronic device according to one embodiment.

FIG. 5 is a partial cross-sectional diagram of a portion of a portable electronic device 500 according to one embodiment. The portable electronic device 500 includes a housing 502 for the portable electronic device 500. The housing 502 has an opening 504 that allows audio sound to enter or be emitted from the portable electronic device 500. The portable electronic device 500 includes an audio element 506 provided internal to the housing 502 for the portable electronic device 500. The audio element 506 can represent a speaker driver (e.g., speaker) and/or a receiver (e.g., microphone).

When the audio element 506 serves as a receiver, audio sound can be picked-up via the opening 504 in the housing 502. The sound, in this example, can be environment or can be audio sound (e.g., voice communications) associated with a user.

Alternatively, when the audio element 506 serves as a speaker driver, the speaker driver 506 upon controlled activation can produce audio sound that can be directed out of the opening 504 of the housing 502. For example, the audio sound can be associated with playback of digital media asset, such as a video file (e.g., movie), an audio file (e.g., music, e-book or podcast), etc., by the portable electronic device 500. As another example, the audio sound can be associated with a user, such as a voice conversation, using the portable electronic device 500 as a wireless telephone.

In the low-profile design for the portable electronic device 500, the compactness of the portable electronic device 500 is of importance. Consequently, placement of the audio element 506 within the housing 502 for the portable electronic device 500 is managed such that the overall size and/or thickness of the portable electronic device 500 is able to remain compact (e.g., thin).

As shown in FIG. 5, an audio channel can be established between the audio element 506 and the opening 504. The audio element 506 can be acoustically coupled to the opening 504 in the housing 502 by or via various components that participate in providing the audio channel. In the embodiment illustrated in FIG. 5, the audio channel can extend from the audio element 506 proximate to the opening 504 in the housing 502.

To further support the audio channel, the portable electronic device 500 can include an acoustic chamber 508 (or audio boot). The acoustic chamber 508 can include an internal audio channel 510 that extends through the acoustic chamber 508 from a first end to a second end. In one embodiment, the acoustic chamber 508 can be a single structure that can be formed with a molding process. For example, the acoustic chamber can be formed of an elastomer (e.g., plastic (including thermoplastic elastomer), rubber or foam), such as nylon, silicone, Acrylonitrile Butadiene Styrene (ABS), or polypropylene.

The first end of the acoustic chamber 508 can abut against the audio element 506. The first end of the acoustic chamber 508 can be secured and/or acoustically sealed to the audio element 506 by any of a variety of ways, including a mechanical feature, a gasket, adhesive and the like, or some combination thereof. The second end of the acoustic chamber 508 can be acoustically coupled to a cosmetic barrier 512 (e.g., cosmetic mesh barrier). The cosmetic barrier 512 has an outer portion 514 (e.g., peripheral portion) that has been modified to facilitate sealing with the acoustic chamber 508 and/or the housing 502. Various approaches to modify the outer portion 514 of the cosmetic barrier 512 are described herein. An adhesive layer 516 can be provided to couple the second end of the acoustic chamber 508 to a first side of the cosmetic barrier 512. A second side of the cosmetic barrier 512 can be acoustically coupled to the housing 502 around the opening 504 in the housing 502. An adhesive layer 518 can be provided to couple a second side of the cosmetic barrier 512 to the inner surface of the housing 502. Since the outer portion 514 of the cosmetic barrier 512 has been modified, the ability to reliably seal the cosmetic barrier 512 to the acoustic chamber 508 or the inner surface of the housing 502 is improved. For example, the outer portion 514 can be rendered more planar (e.g., flatter) and less porous, so that sealing thereto is easier to achieve. Advantageously, the thickness of the adhesive layer 516 and/or the adhesive layer 518 can typically be significantly reduced (as compared to conventional thicknesses) since reliable sealing has been made easier. For example, in one embodiment, if a prior adhesive layer thickness was 1 mm, then the invention can enable the adhesive layer thickness to be reduced to about 0.4 mm.

Figure 6:
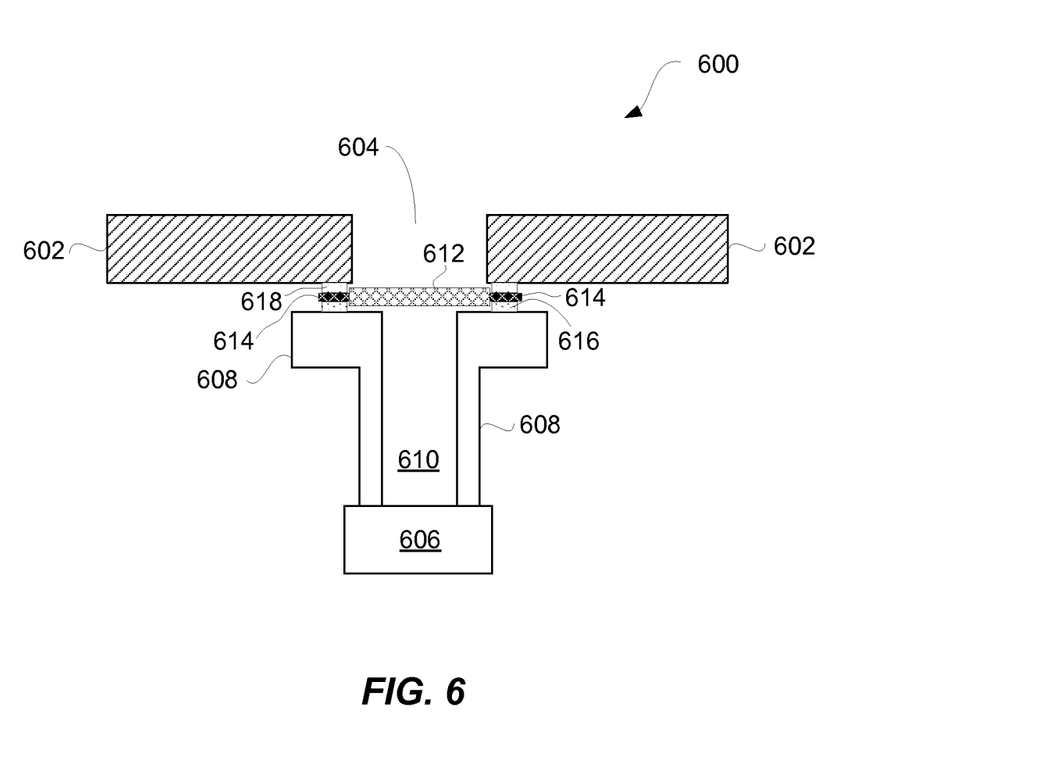
FIG. 6 is a partial cross-sectional diagram of a portion of a portable electronic device according to another embodiment.

FIG. 6 is a partial cross-sectional diagram of a portion of a portable electronic device 600 according to another embodiment. The portable electronic device 600 shown in FIG. 6 is similar to the portable electronic device 500 shown in FIG. 5, except that its outer portions are modified differently.

The portable electronic device 600 includes a housing 602 for the portable electronic device 600. The housing 602 has an opening 604 that allows audio sound to enter or be emitted from the portable electronic device 600. The portable electronic device 600 includes an audio element 606 provided internal to the housing 602 for the portable electronic device 600. The audio element 606 can represent a speaker driver (e.g., speaker) and/or a receiver (e.g., microphone).

When the audio element 606 serves as a receiver, audio sound can be picked-up via the opening 604 in the housing 602. The sound, in this example, can be environment or can be audio sound (e.g., voice communications) associated with a user.

Alternatively, when the audio element 606 serves as a speaker driver, the speaker driver 606 upon controlled activation can produce audio sound that can be directed out of the opening 604 of the housing 602. For example, the audio sound can be associated with playback of digital media asset, such as a video file (e.g., movie), an audio file (e.g., music, e-book or podcast), etc., by the portable electronic device 600. As another example, the audio sound can be associated with a user, such as a voice conversation, using the portable electronic device 600 as a wireless telephone.

In the low-profile design for the portable electronic device 600, the compactness of the portable electronic device 600 is of importance. Consequently, placement of the audio element 606 within the housing 602 for the portable electronic device 600 is managed such that the overall size and/or thickness of the portable electronic device 600 is able to remain compact (e.g., thin).

As shown in FIG. 6, an audio channel can be established between the audio element 606 and the opening 604. The audio element 606 can be acoustically coupled to the opening 604 in the housing 602 by or via various components that participate in providing the audio channel. In the embodiment illustrated in FIG. 6, the audio channel can extend from the audio element 606 proximate to the opening 604 in the housing 602.

To further support the audio channel, the portable electronic device 600 can include an acoustic chamber 608 (or audio boot). The acoustic chamber 608 can include an internal audio channel 610 that extends through the acoustic chamber 608 from a first end to a second end. In one embodiment, the acoustic chamber 608 can be a single structure that can be formed with a molding process. For example, the acoustic chamber can be formed of an elastomer (e.g., plastic (including thermoplastic elastomer), rubber or foam), such as nylon, silicone, Acrylonitrile Butadiene Styrene (ABS), or polypropylene.

The first end of the acoustic chamber 608 can abut against the audio element 606. The first end of the acoustic chamber 608 can be secured and/or acoustically sealed to the audio element 606 by any of a variety of ways, including a mechanical feature, a gasket, adhesive and the like, or some combination thereof. The second end of the acoustic chamber 608 can be acoustically coupled to a cosmetic barrier 612 (e.g., cosmetic mesh barrier). The cosmetic barrier 612 has an outer portion 614 (e.g., peripheral portion) that has been modified to facilitate sealing with the acoustic chamber 608 and/or the housing 602. In this embodiment, the outer portion 614 of the cosmetic barrier 612 has a reduced thickness as compared to an inner portion. For example, the outer portion 614 can be compressed to provide the reduced thickness. An adhesive layer 616 can be provided to couple the second end of the acoustic chamber 608 to a first side of the cosmetic barrier 612. A second side of the cosmetic barrier 612 can be acoustically coupled to the housing 602 around the opening 604 in the housing 602. An adhesive layer 618 can be provided to couple a second side of the cosmetic barrier 612 to the inner surface of the housing 602. Since the outer portion 614 of the cosmetic barrier 612 has been modified, the ability to reliably seal the cosmetic barrier 612 to the acoustic chamber 608 or the inner surface of the housing 602 is improved. Specifically, the compression of the cosmetic barrier 612, which is often a woven wire structure, can render the outer portion 614 less porous so that less air is able to pass therethrough. The outer portion 614 can also be more planar (e.g., flatter) so that sealing thereto is easier to achieve. Further, due to the modification to the outer portion 614, such as through compression, the thickness of the outer portion 614 is reduce which further assists in providing a compact audio port. Advantageously, the thickness of the adhesive layer 616 and/or the adhesive layer 618 can typically be significantly reduced (as compared to conventional thicknesses) since reliable sealing has been made easier by the use of the outer portion 614. For example, in one embodiment, if a prior adhesive layer thickness was 1 mm, then the invention can enable the adhesive layer thickness to be reduced to about 0.4 mm.

Although FIGS. 5 and 6 indicate use of a single mesh structure, or barrier, it should be noted that multiple mesh structures can be provided for an audio opening of an electronic device. For example, the multiple mesh structures can be stacked on one another, directly or separated by intermediate structures or materials. In one embodiment, one mesh can primarily serve as a cosmetic mesh and another mesh can serve primarily to block foreign substances. For example, in a mesh stack, one mesh can be a stainless steel mesh and another mesh can be a polymer hydrophobic mesh.

FIGS. 7-10 pertain to additional examples of processing to form improved cosmetic meshes as discussed above and installing them.

Figure 7:
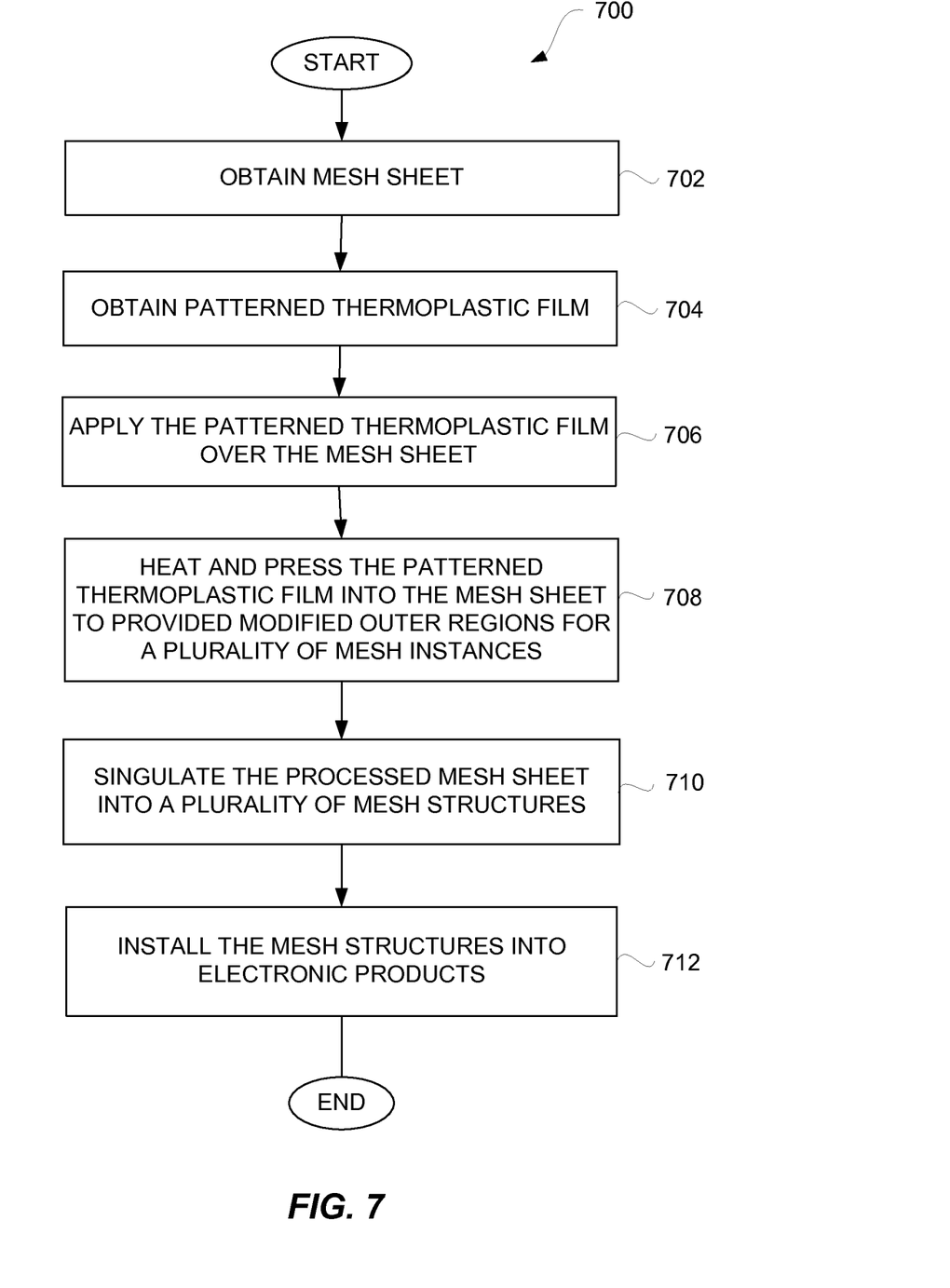
FIG. 7 is a flow diagram of a mesh assembly process according to one embodiment.

FIG. 7 is a flow diagram of a mesh assembly process 700 according to one embodiment. The mesh assembly process 700 can serve to produce mesh structures that can be used with electronic device housings. As previously noted, a mesh structure can pertain to a barrier, or mesh barrier, that serves to block undesired foreign substances from entry or further entry into an audio chamber provided internal to an electronic device housing and/or serves to block vision into an audio opening (or the internal audio chamber) of the electronic device housing. For example, a mesh structure can provided at or near an opening at outer surface of an electronic device housing and serve a cosmetic purpose, and in such case be referred to as a cosmetic mesh.

The mesh assembly process 700 can initially obtain 702 a mesh sheet. Typically, the mesh sheet is formed from a series of interwoven wire elements. As an example, the wire elements can be stainless steel, and the wire elements can be interwoven to form the mesh. In addition, a patterned thermoplastic film can also be obtained 704. The thermoplastic film can be patterned (or can be patterned) to correspond to outer regions of a plurality of mesh instances to be formed.

Next, the patterned thermoplastic film can be applied 706 over the mesh sheet. For example, the patterned thermoplastic film can be placed adjacent top and/or bottom surfaces of the mesh sheet. After the patterned thermoplastic film has been applied 706 over the mesh sheet, the patterned thermoplastic film can be heated and pressed 708 into the mesh sheet to thereby provide modified outer regions for a plurality of the mesh instances. For example, the result of the thermoplastic film being heated and pressed 708 into the mesh sheet is that the thermoplastic film is deposited, bonded or embedded at outer regions (but not inner regions) of a plurality of mesh instances that are being formed. As a result, the outer regions of each of the plurality of mesh instances are able to more reliably seal with an audio port or chamber, so that enhanced audio sound quality can be offered by the corresponding electronic products, particularly compact portable electronic devices.

The processed mesh sheet can be singulated 710 into a plurality of mesh structures. Subsequently, as desired, the mesh structures can be installed 712 into electronic products. Typically, a mesh structure produced by the mesh assembly process 700 can be secured at or proximate to an audio port opening in an electronic device housing. By processing the mesh sheet to form the modified outer regions, the resulting individual mesh barriers are able to more reliably acoustically seal (or couple) with (i) an audio port or chamber and/or (ii) an opening in an outer device housing (proximate to the audio port or chamber) in a space efficient manner.

Figure 8:
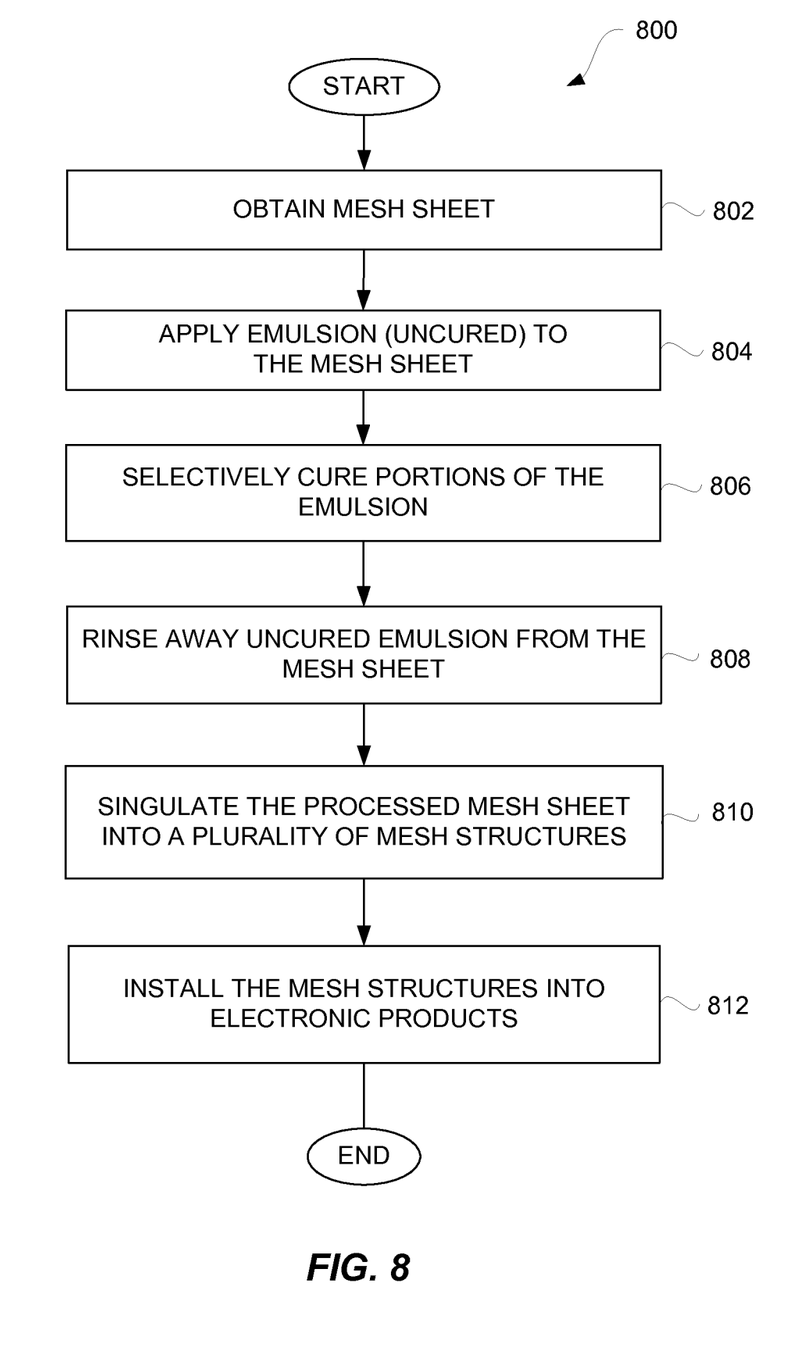
FIG. 8 is a flow diagram of a mesh assembly process according to another embodiment.

FIG. 8 is a flow diagram of a mesh assembly process 800 according to another embodiment. The mesh assembly process 800 can serve to produce mesh structures that can be used with electronic device housings. As previously noted, a mesh structure can pertain to a barrier, or mesh barrier, that serves to block undesired foreign substances from entry or further entry into an audio chamber provided internal to an electronic device housing and/or serves to block vision into an audio opening (or the internal audio chamber) of the electronic device housing. For example, a mesh structure can provided at or near an opening at outer surface of an electronic device housing and serve a cosmetic purpose, and in such case be referred to as a cosmetic mesh.

The mesh assembly process 800 can initially obtain 802 a mesh sheet. Typically, the mesh sheet is formed from a series of interwoven wire elements. As an example, the wire elements can be stainless steel, and the wire elements can be interwoven to form the mesh. In addition, an emulsion can be applied 804 to the mesh sheet.

After the emulsion has been applied 804 to the mesh sheet, the portions of the emulsion can be selectively cured 806. Upon being cured 806 the selective portions bind to the mesh sheet. Next, remaining uncured emulsion can be rinsed 808 away from the mesh sheet. Following the rinse 808, those selective portions that were the emulsion was cured remain bound to the mesh sheet. The selective portions can serve as modified outer regions for a plurality of the mesh instances. For example, the result of the cured emulsion is bound to the mesh sheet at outer regions (but not inner regions) of a plurality of mesh instances that are being formed. As a result, the outer regions of each of the plurality of mesh instances are able to more reliably seal with an audio port or chamber, so that enhanced audio sound quality can be offered by the corresponding electronic products, particularly compact portable electronic devices.

The processed mesh sheet can then be singulated 810 into a plurality of mesh structures. Subsequently, as desired, the mesh structures can be installed 812 into electronic products. Typically, a mesh structure produced by the mesh assembly process 800 can be secured at or proximate to an audio port opening in an electronic device housing. By processing the mesh sheet to form the modified outer regions, the resulting individual mesh barriers are able to more reliably acoustically seal (or couple) with (i) an audio port or chamber and/or (ii) an opening in an outer device housing (proximate to the audio port or chamber) in a space efficient manner.

Figure 9:
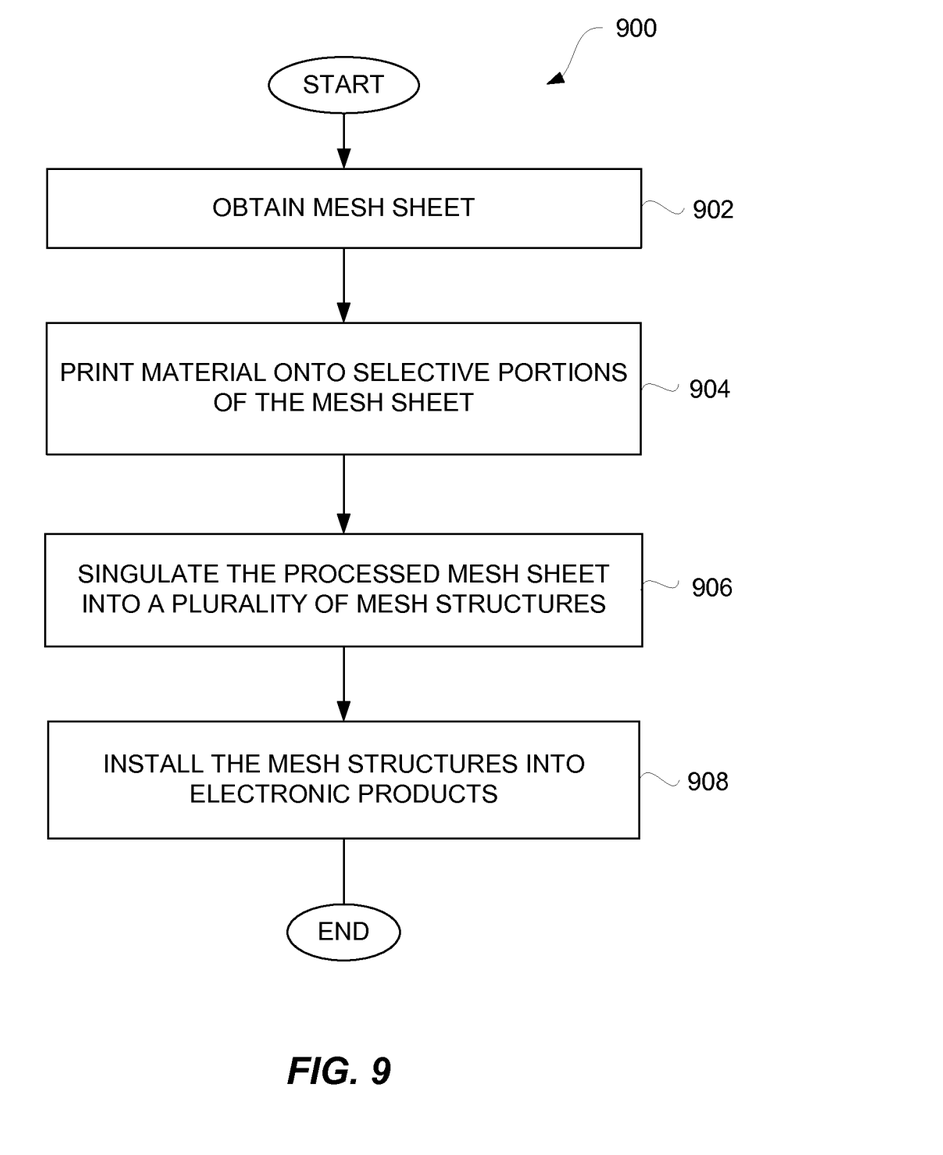
FIG. 9 is a flow diagram of a mesh assembly process according to another embodiment.

FIG. 9 is a flow diagram of a mesh assembly process 900 according to another embodiment. The mesh assembly process 900 can serve to produce mesh structures that can be used with electronic device housings. As previously noted, a mesh structure can pertain to a barrier, or mesh barrier, that serves to block undesired foreign substances from entry or further entry into an audio chamber provided internal to an electronic device housing and/or serves to block vision into an audio opening (or the internal audio chamber) of the electronic device housing. For example, a mesh structure can provided at or near an opening at outer surface of an electronic device housing and serve a cosmetic purpose, and in such case be referred to as a cosmetic mesh.

The mesh assembly process 900 can initially obtain 902 a mesh sheet. Typically, the mesh sheet is formed from a series of interwoven wire elements. As an example, the wire elements can be stainless steel, and the wire elements can be interwoven to form the mesh.

Next, material can be printed 904 onto selective portions of the mesh sheet. The printing can be by any of a variety of techniques, including inkjet printing, pad printing or silk-screen printing. The material being printed can be a silicone-based ink or paint. As the material printed dries, the material binds to the selective portions. The printing can be performed on one side or multiple sides of the mesh sheet. The printing can also be performed multiple times so as to accumulate the printed material at the selective portions of the mesh sheet.

The selective portions being printed 904 can serve as modified outer regions for a plurality of the mesh instances. For example, the result of the material printed to the mesh sheet at outer regions (but not inner regions) of a plurality of mesh instances that are being formed is that the outer regions become filled or solid (or at least significantly more filled or solid than previously), in that less air can pass through the outer regions. As a result, the outer regions of each of the plurality of mesh instances are able to more reliably seal with an audio port or chamber, so that enhanced audio sound quality can be offered by the corresponding electronic products, particularly compact portable electronic devices.

The processed mesh sheet can then be singulated 906 into a plurality of mesh structures. Subsequently, as desired, the mesh structures can be installed 908 into electronic products. Typically, a mesh structure produced by the mesh assembly process 900 can be secured at or proximate to an audio port opening in an electronic device housing. By processing the mesh sheet to form the modified outer regions, the resulting individual mesh barriers are able to more reliably acoustically seal (or couple) with (i) an audio port or chamber and/or (ii) an opening in an outer device housing (proximate to the audio port or chamber) in a space efficient manner.

Figure 10:
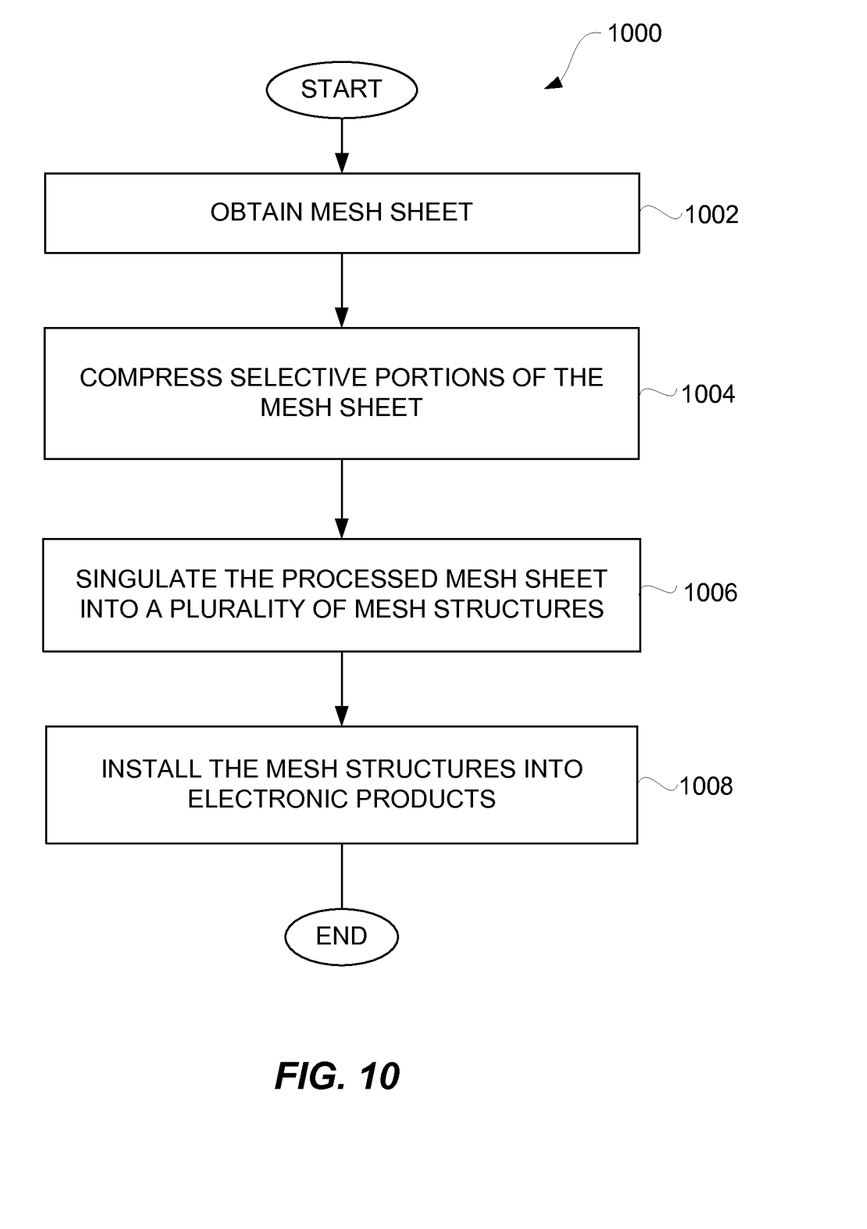
FIG. 10 is a flow diagram of a mesh assembly process according to still another embodiment.

FIG. 10 is a flow diagram of a mesh assembly process 1000 according to still another embodiment. The mesh assembly process 1000 can serve to produce mesh structures that can be used with electronic device housings. As previously noted, a mesh structure can pertain to a barrier, or mesh barrier, that serves to block undesired foreign substances from entry or further entry into an audio chamber provided internal to an electronic device housing and/or serves to block vision into an audio opening (or the internal audio chamber) of the electronic device housing. For example, a mesh structure can be provided at or near an opening at outer surface of an electronic device housing and serve a cosmetic purpose, and in such case be referred to as a cosmetic mesh.

The mesh assembly process 1000 can initially obtain 1002 a mesh sheet. Typically, the mesh sheet is formed from a series of interwoven wire elements. As an example, the wire elements can be stainless steel, and the wire elements can be interwoven to form the mesh.

Next, selective portions of the mesh sheet can be compressed 1004. The compression can result from the application of pressure to the selective portions of the mesh sheet. The selective portions being compressed 1004 can serve as modified outer regions for a plurality of the mesh instances. For example, the result of the compression 1004 to the mesh sheet at outer regions (but not inner regions) of a plurality of mesh instances is that the outer regions become flattened (or at least significantly more flattened than previously) so that less air can pass through the outer regions. As a result, the outer regions of each of the plurality of mesh instances are able to more reliably seal with an audio port or chamber, so that enhanced audio sound quality can be offered by the corresponding electronic products, particularly compact portable electronic devices.

The processed mesh sheet can then be singulated 1006 into a plurality of mesh structures. Subsequently, as desired, the mesh structures can be installed 1008 into electronic products. Typically, a mesh structure produced by the mesh assembly process 1000 can be secured at or proximate to an audio port opening in an electronic device housing. By processing the mesh sheet to form the modified outer regions, the resulting individual mesh barriers are able to more reliably acoustically seal (or couple) with (i) an audio port or chamber and/or (ii) an opening in an outer device housing (proximate to the audio port or chamber) in a space efficient manner.

Additional details on speaker arrangements can be found in: (1) U.S. patent application Ser. No. 12/794,561, filed Jun. 4, 2010 and entitled "AUDIO PORT CONFIGURATION FOR COMPACT ELECTRONIC DEVICES," which is hereby incorporated herein by reference; and (2) U.S. patent application Ser. No. 12/698,957, filed Feb. 2, 2010 and entitled "LOW-PROFILE SPEAKER ARRANGEMENTS FOR COMPACT ELECTRONIC DEVICES," which is hereby incorporated herein by reference.

Additional details on audio port configurations can be found in: (1) U.S. Provisional Application No. 61/325,803, filed Apr. 19, 2010 and entitled "AUDIO PORT CONFIGURATION FOR COMPACT ELECTRONIC DEVICES," which is hereby incorporated herein by reference; (2) U.S. application Ser. No. 12/794,561, filed Jun. 4, 2010 and entitled "AUDIO PORT CONFIGURATION FOR COMPACT ELECTRONIC DEVICES," which is hereby incorporated herein by reference; and (3) U.S. application Ser. No. 13/163,308, filed Jun. 17, 2011 and entitled "AUDIO PORT CONFIGURATION FOR COMPACT ELECTRONIC DEVICES," which is hereby incorporated herein by reference.

Embodiments of the invention are well suited for portable, battery-powered electronic devices, and more particularly handheld battery-powered electronic devices. Examples of portable, battery-powered electronic devices can include laptops, tablet computers, media players, phones, GPS units, remote controls, personal digital assistant (PDAs), and the like.

The various aspects, features, embodiments or implementations of the invention described above can be used alone or in various combinations.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A mesh structure for an acoustic port opening of an outer surface of a housing of a portable electronic device, the mesh structure comprising:
    a mesh article positioned above an audio element of the portable electronic device, the mesh article having a weave configuration of overlapping elements, the mesh article having a central portion and an outer peripheral portion, wherein the outer peripheral portion is:
    processed to integrate a material interstitially with the weave configuration thereby reducing the porosity of the peripheral portion with respect to the central portion; and
    configured to receive an adhesive after being processed, the adhesive facilitating acoustic sealing of the mesh article within the acoustic port.

2. A mesh structure as recited in claim 1, wherein the processed outer peripheral portion provides a frame for the mesh article.

3. A mesh structure as recited in claim 2, wherein the frame is configured to form an acoustic seal between the mesh article and the housing of the portable electronic device.

4. A mesh structure as recited in claim 1, wherein the processed outer peripheral portion has a more planer surface as compared to the central portion.

5. A mesh structure as recited in claim 1, wherein the mesh structure is a mesh barrier that prevents debris from entering the acoustic port.

6. A mesh structure as recited in claim 1, wherein the material integrated into the outer peripheral portion includes an adhesive.

7. A mesh structure as recited in claim 1, wherein the material integrated into the outer peripheral portion includes a light cured material.

8. A mesh structure as recited in claim 1, wherein the material integrated into the outer peripheral portion includes an ink.

9. A mesh structure as recited in claim 1, wherein the material integrated into the outer peripheral portion includes a metal deposited using an electroforming process.

10. A mesh structure as recited in claim 1, wherein the material integrated into the outer peripheral portion includes a thermoplastic material.

11. A mesh structure as recited in claim 1, wherein the processed outer peripheral portion is compressed with respect to the central portion.

12. A mesh structure for an acoustic port opening of a portable electronic device, the mesh structure comprising:
    a middle portion; and
    an outer portion having a material interstitially integrated within the mesh structure, wherein the outer portion is:
    less porous than the middle portion; and
    configured to receive an adhesive layer that facilitates acoustic sealing of the mesh structure within the acoustic port after the material is integrated into the outer portion.

13. A mesh structure as recited in claim 12, wherein the outer portion provides a frame for the mesh structure.

14. A mesh structure as recited in claim 13, wherein the frame is configured to form an acoustic seal between the mesh article and the housing of the portable electronic device.

15. A mesh structure as recited in claim 12, wherein the outer portion is substantially more planer than the middle portion.

16. A mesh structure as recited in claim 12, wherein the material integrated into the outer portion includes a silicone materials.

17. A mesh structure as recited in claim 12, wherein the material integrated into the outer portion includes a light-cured adhesive.

18. A mesh structure as recited in claim 12, wherein at least a portion of the mesh structure is hydrophobic.

19. A mesh structure for an acoustic port of an electronic device, comprising:

a woven mesh article having an inner region having a first thickness and a peripheral region having a second thickness that is less than the first thickness, wherein:
    the peripheral region includes a material embedded within the woven mesh;
    the peripheral region is less porous than the inner region; and
    the woven mesh is configured to be positioned relative to an acoustic port formed in a housing of a portable electronic device.

20. The mesh structure of claim 19, wherein the peripheral region comprises a recess disposed on at least one of a top surface of the peripheral region and a bottom surface of the peripheral region.

21. The mesh structure of claim 19, wherein the peripheral region is compressed with respect to the inner region.

\* \* \* \* \*